United States Patent Office 3,393,118
Patented July 16, 1968

3,393,118
PERFORATE LAMINATED PAPER
PACKAGING MATERIAL
Karl-Erik Ekström, Lund, Sweden, assignor to AB Tetra Pak, Lund, Sweden, a Swedish company
Filed Nov. 6, 1964, Ser. No. 409,536
Claims priority, application Sweden, Nov. 9, 1963, 12,377/63
1 Claim. (Cl. 161—113)

ABSTRACT OF THE DISCLOSURE

A laminated packaging material having an easily breakable opening which is composed of a relatively thick layer of paper having openings therein with the openings covered by a thinner section of paper which is laminated to the thick layer of paper.

Figure 1:
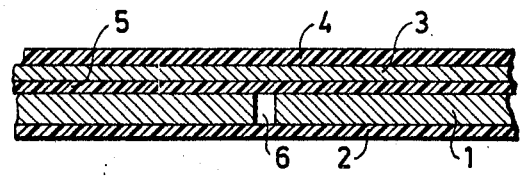

The present invention refers to a laminated packaging material having an easily breakable opening-defining marking and comprising a relatively thick paper layer with perforated portions and coatings of a heat sealing thermoplastic material covering both sides of said layer.

In the packaging industry it is well-known to use packaging materials which consist of plastic covered paper. The advantages of these materials are that most of the plastic materials, e.g. polyethylene or polypropylene, are liquid-tight and fat resistant and that they are heat sealable. The heat sealing capacity is a very important characteristic of the plastic materials and makes a swift and rational sealing method possible, where the sealing joint created attains a considerable strength very soon after the sealing operation, at the same time as it affords the same tightness characteristics as the packaging material as a whole.

A package which is made from such packaging material as here referred to is usually opened by breaking through the package wall by scissors, a knife or any other sharp-edged object. Since such a tool is not always available when a package is to be opened, it is desirable to provide the packages with breakable opening-defining markings which can be torn up without having any tool available and without tearing the wall material of the package to rags. These opening-defining markings are usually made in such a way that the package wall is partly or wholly perforated along the portions of the package where the opening-defining marking is applied.

In those cases where packages are produced from a web of material it is of course convenient to carry out the stamping operations necessary for the opening-defining marking on the web of material which is then mechanically converted into packages. However, it has been found that the weakenings of the web which are obtained in stamping the opening-defining markings in many cases jeopardize the breaking strength of the web, i.e. the web is ruptured at the weakened portions when treated in the machines which convert the web into packages.

Since these conversion machines tend to operate at an ever increasing capacity, i.e. they tend to work at higher and higher web speeds, the tensile stress in the web of packaging material being worked up is also increased, whereby the problem is more and more accentuated.

The present invention provides a packaging material laminate by means of which the said drawbacks are obviated.

It is characterized by the fact that a relatively thin plastic coated paper layer is laminated with a thin heat sealing thermoplastic layer as a binding agent to a thicker paper layer having perforated portions for the purpose of strengthening the packaging material which has been weakened by the perforations of the thicker paper layer. The invention also provides a method of providing a laminate of this kind, in which the thicker paper layer is first perforated by means of a punching procedure at the points where the opening-defining marking is to be located, and that the paper layer thus perforated is then laminated by means of a thermoplastic layer serving as a binding agent to the uncoated face of a plastic paper laminate previously produced, whereupon the uncoated face of the thicker paper layer is finally coated with a thermoplastic material layer.

Figure 2:
Figure 3:
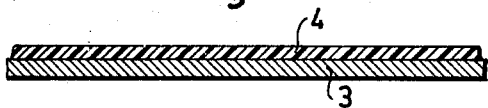
Figure 4:
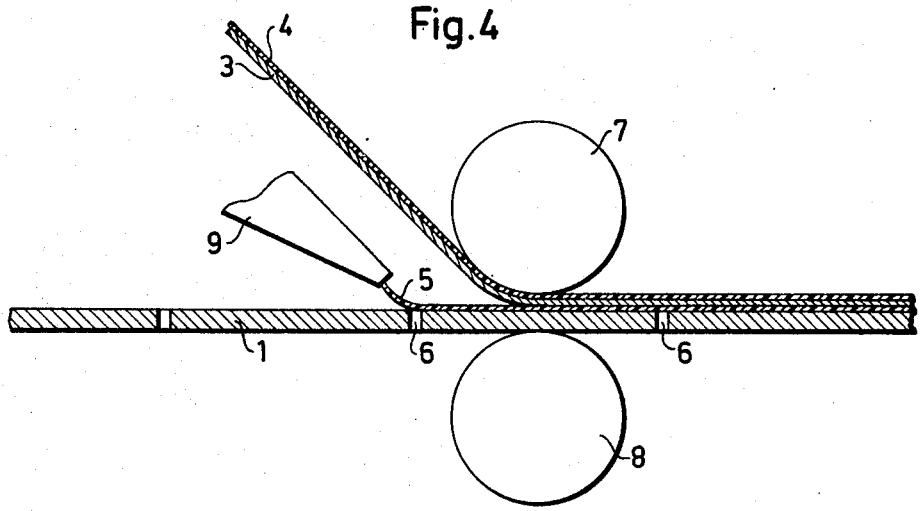

The invention will be described in the following with reference to the accompanying diagrammatic drawing, in which FIG. 1 is an enlarged transverse section of the packaging laminate according to the invention, FIG. 2 shows the thicker paper layer provided with perforations, FIG. 3 shows a thinner paper layer plastic coated on one side, and FIG. 4 illustrates the method of laminating the thicker to the thinner paper layer.

The packaging material laminate shown in FIG. 1 consists of a thicker paper layer 1 which has been provided by a punching process with perforated portions 6 serving as an opening-defining marking in the finished package.

This thicker paper layer which is assumed to be the supporting layer of the packaging material is furthermore provided with an outer plastic coating 2 and is laminated by a binding layer 5 of thermoplastic material to a thinner paper layer 3 which is in turn covered with a covering 4 of thermoplastic material.

The laminate shown in FIG. 1 is intended to be used so that the plastic layer 4 forms the inner side of the package to be produced, the thicker paper layer provided with perforating cut-outs forming the outer paper layer of the package.

The manufacturing of the laminate according to the invention must be carried out so that the paper layer 1 shown in FIG. 2 is not subjected to substantial tensile stresses after performing the punching operation perforating the paper layer.

For the purpose of strengthening the perforated paper layer, without thereby imparting to the laminate such characteristics that the opening-defining marking will be difficult to tear up, a thin paper web 3 coated with a plastic layer 4 is produced, an enlarged transverse section thereof being shown in FIG. 3. The strengthening laminated layer contains a thin paper layer 3, since a plastic layer alone would be too elastic and, consequently, would not be able to take up tensile stresses which are applied to the thicker paper layer 1.

The uncotated face of the thinner paper layer 3 is thereupon laminated to the thicker perforated paper web 1 by means of a procedure illustrated in FIG. 4.

The paper web 1 and the thinner web 3 coated with a plastic layer 4 are introduced according to FIG. 4 between a pair of pressure rolls 7 and 8 of rubber. In order to obtain adhesion between the two paper layers 1 and 3 a layer of a thermoplastic material, e.g. polyethylene, is extruded on to the web 1 immediately before the webs 1 and 3 are pressed against each other by means of the rolls 7 and 8. Since the plastic layer 5 which is extruded on to the web 1 by means of the extruder 9 still is in a semifluid condition when it is compressed by the rolls 7 and 8 between the webs 1 and 3, the plastic material penetrates into the fibres of the paper surfaces and thus bonds the two paper layers together.

When the laminating process illustrated in FIG. 4 is completed, the outer face of the paper web 1 is preferably coated with a thermoplastic material, whereupon the laminate is ready to be converted into packages in a packaging machine without any risk of the web of material being torn off.

The plastic layer 2 applied to the thicker paper layer 1 need not be applied to the web 1 after this has been lamintaed to the thinner paper layer 3, but it may obviously be extruded on to the web 1 as soon as the punching operation has been carried out.

Further the thinner paper layer 3 must not necessarily be laminated to the thicker paper layer 1 by means of a thermoplastic binder as shown in the preferred embodiment described. Consequently it is equivalent and in accordance with the idea of the invention if the thinner layer 3 is laminated to the thicker layer and by means of glue, laquer or the like.

I claim:

1. A laminated packaging material having an easily breakable opening comprising: a first relatively thick paper layer having a plurality of perforations therein, a second thinner paper layer having one side coated with a plastic material, said second layer having the uncoated side laminated to said first paper layer by a thin heat sealing layer of thermoplastic material therebetween to act as a binder for the two paper layers and a layer of heat sealing thermoplastic material on the other side of said first relatively thick paper layer.

References Cited

UNITED STATES PATENTS

| | | | |
|---|---|---|---|
| 1,765,098 | 6/1930 | Roozendaal | 156—94 |
| 2,116,008 | 5/1938 | Block | 156—94 |
| 2,244,557 | 6/1941 | Iknayan | 156—252 |
| 2,546,698 | 3/1951 | Nicolle | 229—66 |
| 2,800,267 | 7/1957 | O'Neill | 229—51 |
| 3,140,815 | 7/1964 | Majesky | 229—66 |

ROBERT F. BURNETT, *Primary Examiner.*

R. H. CRISS, *Assistant Examiner.*